United States Patent
Sadeghi et al.

(10) Patent No.: US 11,601,836 B2
(45) Date of Patent: Mar. 7, 2023

(54) WLAN SENSING FRAME EXCHANGE PROTOCOL

(71) Applicant: Intel Corporation, Santa Clara, CA (US)

(72) Inventors: Bahareh Sadeghi, Portland, OR (US); Carlos Cordeiro, Portland, OR (US); Claudio Da Silva, Portland, OR (US); Cheng Chen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 77 days.

(21) Appl. No.: 16/897,963

(22) Filed: Jun. 10, 2020

(65) Prior Publication Data

US 2020/0359248 A1  Nov. 12, 2020

Related U.S. Application Data

(60) Provisional application No. 62/864,647, filed on Jun. 21, 2019.

(51) Int. Cl.
| | |
|---|---|
| *H04W 24/10* | (2009.01) |
| *H04W 28/18* | (2009.01) |
| *H04W 8/00* | (2009.01) |
| *H04W 84/12* | (2009.01) |

(52) U.S. Cl.
CPC ........... *H04W 24/10* (2013.01); *H04W 8/005* (2013.01); *H04W 28/18* (2013.01); *H04W 84/12* (2013.01)

(58) Field of Classification Search
CPC ..... H04W 24/10; H04W 8/005; H04W 28/18; H04W 84/12; H04W 48/16; H04W 74/0808
See application file for complete search history.

(56) References Cited

U.S. PATENT DOCUMENTS

2019/0306825 A1* 10/2019 Lindskog ............ H04L 27/2657

* cited by examiner

*Primary Examiner* — Chuong A Ngo
(74) *Attorney, Agent, or Firm* — Schwegman Lundberg & Woessner, P.A.

(57) ABSTRACT

Embodiments of a WLAN sensing frame exchange protocol are generally described herein. In some embodiments, a wireless communication device is configured to perform a WLAN sensing protocol within a basic service set (BSS) comprising one or more stations (STAs) (STA1 and STA2) including an access point station (AP STA). The WLAN sensing protocol comprises a discovery phase, a negotiation phase, a measurement phase, and a reporting phase. To perform the WLAN sensing protocol, the wireless communication device is configured to operate as either a sensing initiator or a sensing responder, and to operate as a sensing transmitter and/or a sensing receiver. Some 60 GHz embodiments relate to WLAN sensing in a PBSS or IBSS with DMG STAs.

21 Claims, 10 Drawing Sheets

WLAN SENSING FRAME EXCHANGE PROTOCOL

PRIORITY CLAIM

This application claims priority under 35 U.S.C. 119(e) to U.S. Provisional Patent Application Ser. No. 62/864,647, filed Jun. 21, 2019 [reference number AC3254-Z], entitled Wi-Fi Sensing Protocol Design and Frame Exchange, which is incorporated herein by reference in its entirety.

TECHNICAL FIELD

Embodiments pertain to wireless local area networks (WLANs). Some embodiments pertain to WLAN sensing. Some embodiments pertain to the IEEE 802.11 WLAN Sensing Study Group. Some embodiments pertain to the IEEE 802.11bf WLAN Sensing Task Group. Some embodiments relate to WLAN sensing using high-efficiency (HE) trigger-based (TB) physical-layer protocol data units (PPDUs) (HE TB PPDUs).

BACKGROUND

WLAN sensing enables motion detection, gesture recognition as well as biometric measurement by using WLAN signals. It creates opportunities for service providers within the home security, health care, enterprise, and building automation and management markets and many more. Thus, there are general needs for a WLAN sensing protocol for various WLAN sensing implementations.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
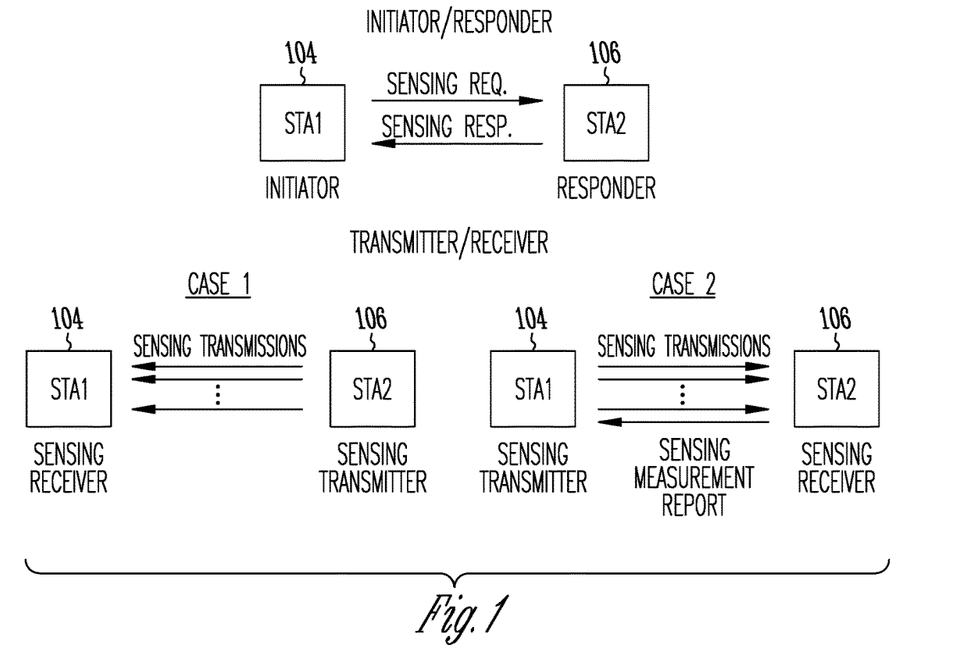
FIG. 1 illustrates classification of a sensing initiator and a sensing responder and classification of sensing transmitter and receiver, in accordance with some embodiments of a WLAN sensing protocol.
Figure 7:
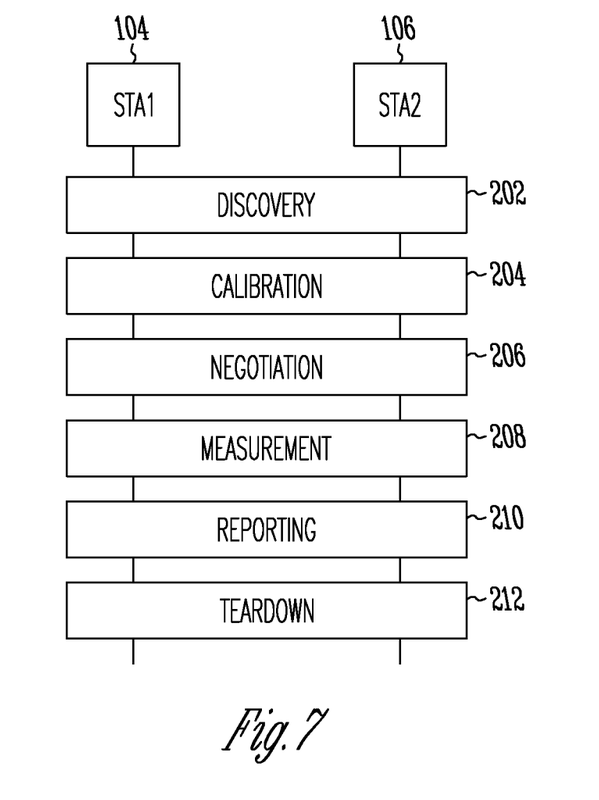
FIG. 7 illustrates the framework of the WLAN sensing protocol in accordance with some embodiments.

In some embodiments, an apparatus of a wireless communication device is configurable for WLAN sensing. The wireless communication device may either be an AP or a non-AP STA. In accordance with some embodiments, the apparatus may comprise processing circuitry and memory. In these embodiments, the processing circuitry is to configure the wireless communication device to perform a WLAN sensing protocol within a basic service set (BSS) comprising one or more stations (STAs) (STA1 104 and STA2 106) including an access point station (AP STA). The WLAN sensing protocol may include a discovery phase 202, a negotiation phase 206, a measurement phase 208, and a reporting phase 210, as illustrated in FIG. 7. The WLAN sensing protocol may also include a discovery phase 202 and a calibration phase 204. As illustrated in FIG. 1, to perform the WLAN sensing protocol, the processing circuitry may configure the wireless communication device to operate as either a sensing initiator or a sensing responder. The processing circuitry may also configure the wireless communication device to operate as a sensing transmitter and/or a sensing receiver.

In some IEEE 802.11ad or IEEE 802.11ay embodiments (e.g., 60 GHz), the wireless communication device may be a DMG STA and may perform a WLAN sensing protocol within PBSS or IBSS. In some of these embodiments, the AP may operate as a PCP for DMG stations.

In some embodiments, during the discovery phase 202, the STAs of the BSS that support WLAN sensing are discovered, at least one of the STAs is identified as a sensing receiver, and one or more of the STAs are identified as potential sensing transmitters. In some embodiments, during the negotiation phase 206, a measurement frequency is determined and one or more of the STAs, identified as the potential sensing transmitters, are designated as sensing transmitters. In some embodiments, during the measurement phase 208, the one or more STAs that are designated as the sensing transmitters are configured to transmit sensing packets for sensing measurements by one or more STAs that are designated as the sensing receivers. In some embodiments, during the reporting phase 210, the sensing measurements are provided to the sensing initiator.

In some embodiments, the sensing measurements may comprise a channel measurement, such as channel state information (CSI), although the scope of the embodiments is not limited in this respect. In some embodiments, a separate discovery phase 202 may not be needed as the operations of the discovery phase 202 may take place during conventional WLAN discovery operations. In some embodiments, the reporting phase 210 is optional. For example, if the sensing initiator is the sensing receiver, reporting of the sensing measurements may not be necessary. In some embodiments, the reporting phase 210 may be performed if the sensing initiator is not the sensing receiver.

Figure 2:
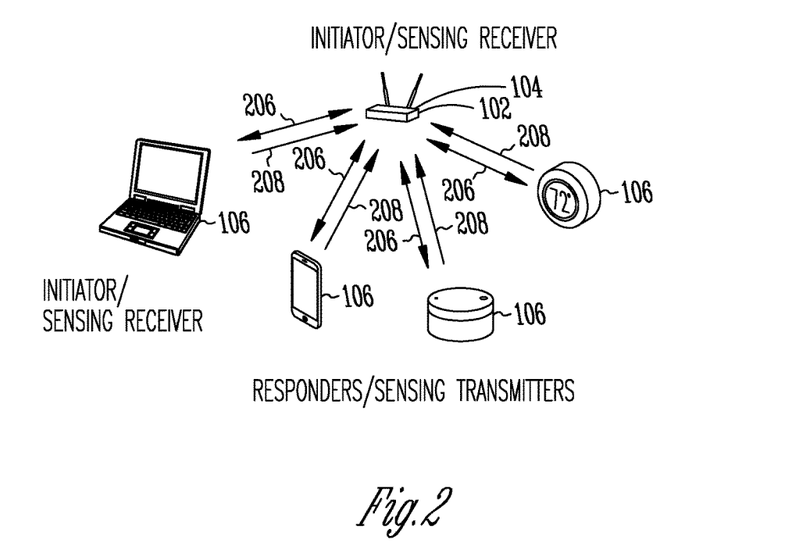
FIG. 2 illustrates scenario one in which an access point (AP) is operating as a sensing initiator and the sensing receiver in accordance with some embodiments of the WLAN sensing protocol.
Figure 9:
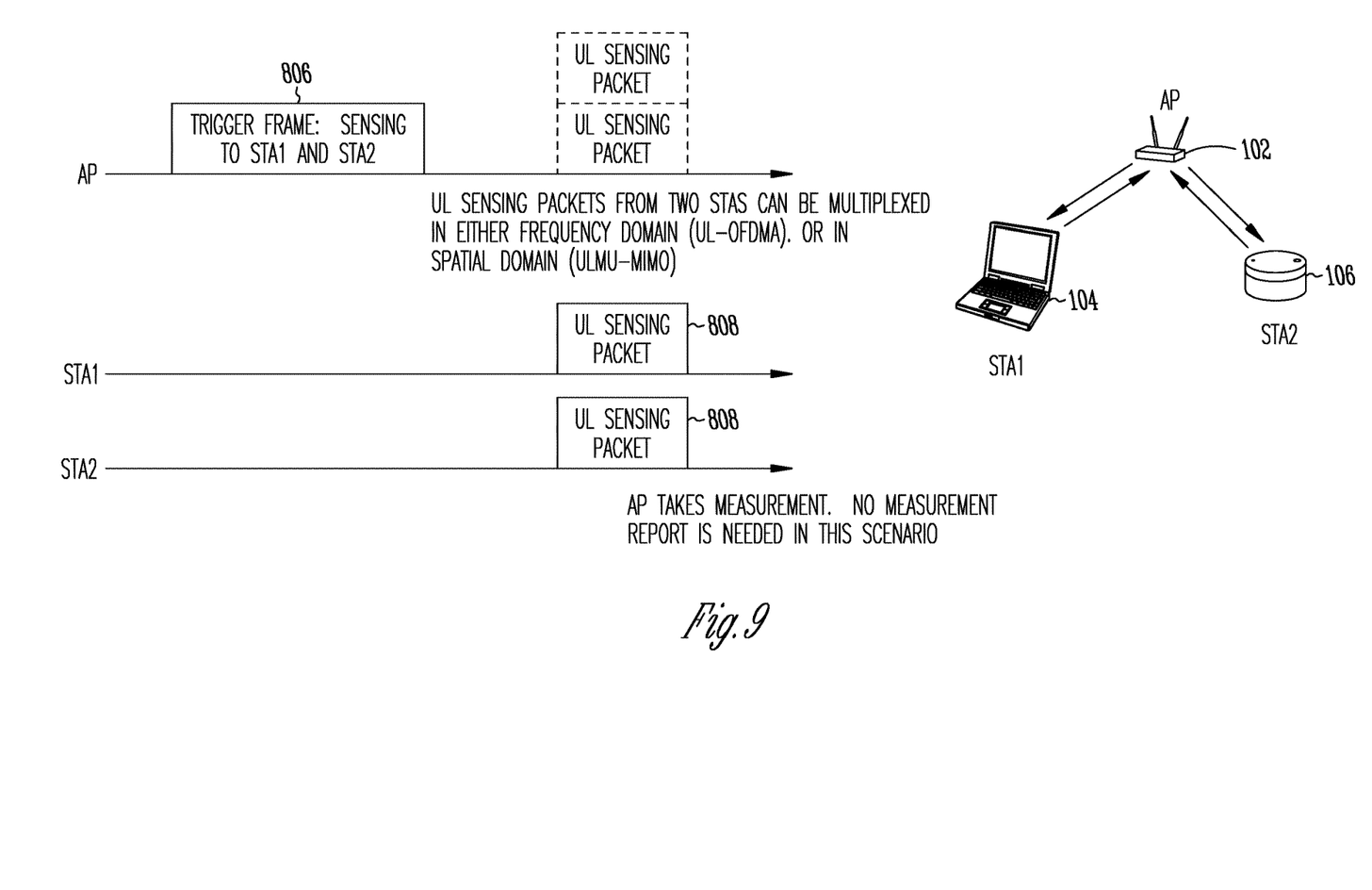
FIG. 9 illustrates the measurement and report phases of WLAN sensing protocol for scenario one in accordance with some embodiments.

In the embodiments illustrated in FIG. 2 and FIG. 9 (scenario 1), if the wireless communication device is an AP STA 102 and is operating as the sensing initiator and if the AP STA 102 is designated as the sensing receiver during the negotiation phase 206, during the measurement phase 208, the AP STA 102 is configured to encode a trigger frame 806 for transmission to the STAs (STA1 104 and STA2 106) that have been designated as sensing transmitters during the negotiation phase 206. The trigger frame 806 triggers the STAs to (regularly and/or periodically) transmit uplink sensing packets to the AP STA 102 (i.e., designated as a sensing receiver) in accordance with either an UL OFDMA or UL MU-MIMO technique. In these embodiments, the AP STA 102 is configured to determine the sensing measurements from the UL sensing packets.

Figure 3:
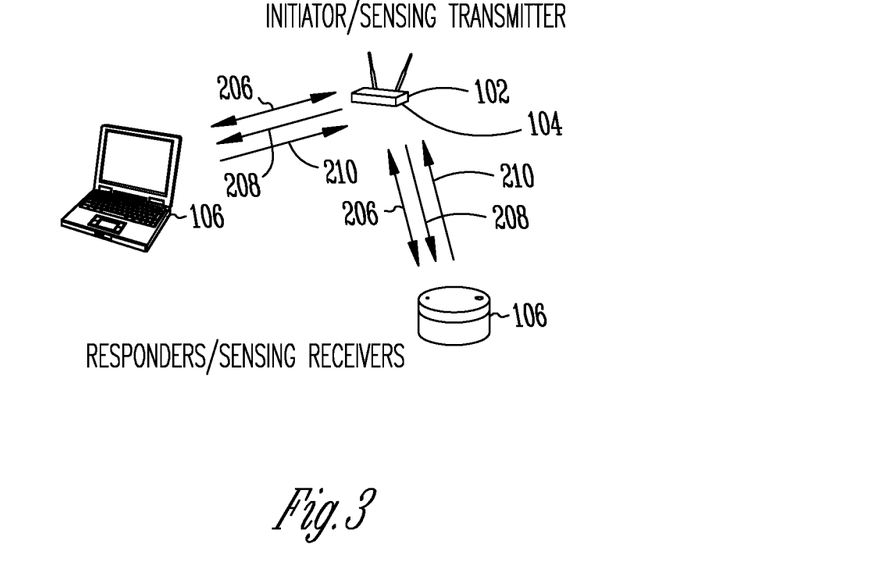
FIG. 3 illustrates scenario two in which the AP is operating as the sensing initiator and a sensing transmitter in accordance with some embodiments of the WLAN sensing protocol.
Figure 10:
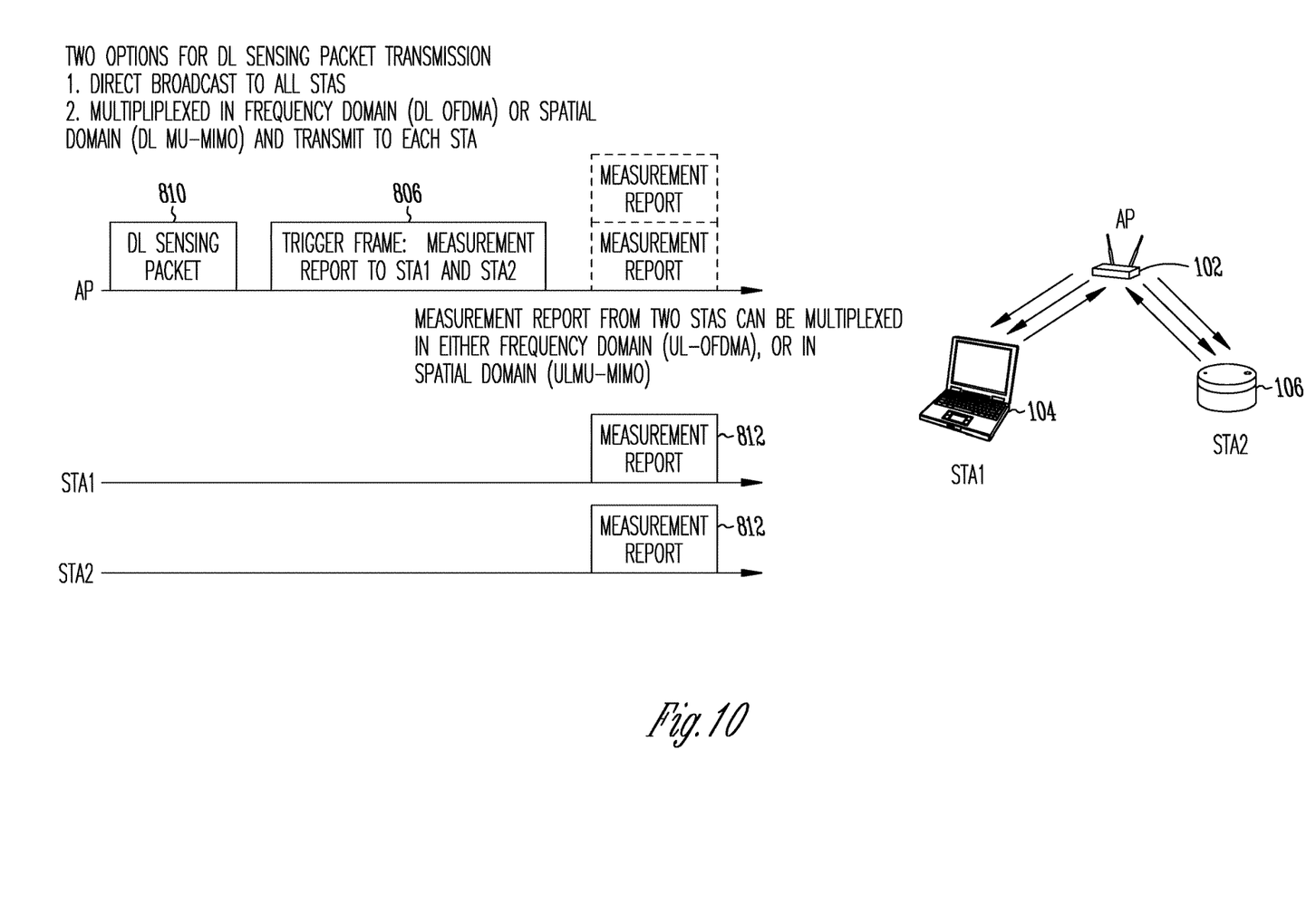
FIG. 10 illustrates the measurement and report phases of WLAN sensing protocol for scenario two in accordance with some embodiments.

In the embodiments illustrated in FIG. 3 and FIG. 10 (scenario 2) if the wireless communication device is an AP STA 102 and is operating as the sensing initiator, and if the AP STA 102 is designated as a sensing transmitter during the negotiation phase 206, during the measurement phase 208 the processing circuitry of the AP STA 102 is configured to transmit a downlink (DL) sensing packet to the STAs (STA1 104 and STA2 106) that have been designated as the sensing receivers during the negotiation phase 206. The downlink sensing packet may either be broadcast by the AP STA 102 or transmitted in accordance with either a DL OFDMA or DL MU-MIMO technique to each of the STAs designated as sensing receivers. In these embodiments, the AP STA 102 may encode a trigger frame 806 for transmission following the DL sensing packet 810. The trigger frame 806 may trigger transmission of measurement report 812 frames by each of the STAs designated as sensing receivers. In these embodiments, during the reporting phase 210, the AP STA 102 is configured to receive measurement reports 812 from the STAs designated as sensing receivers. The measurement report 812 frames may comprise indicators of the sensing measurements that were measured by the STAs.

Figure 4:
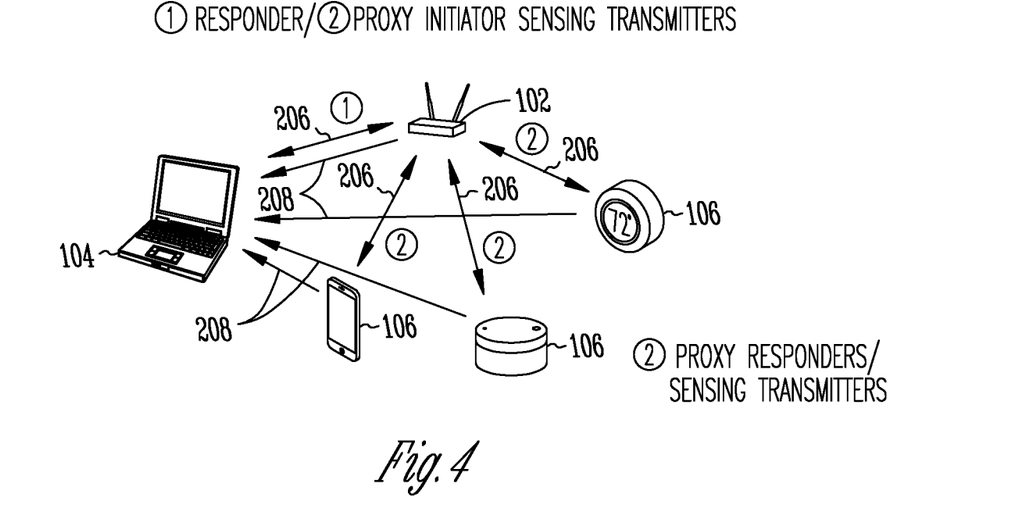
FIG. 4 illustrates scenario three in which a station (STA1) is operating as a sensing initiator and the STA1 is operating as a sensing receiver in accordance with some embodiments of the WLAN sensing protocol.
Figure 11:
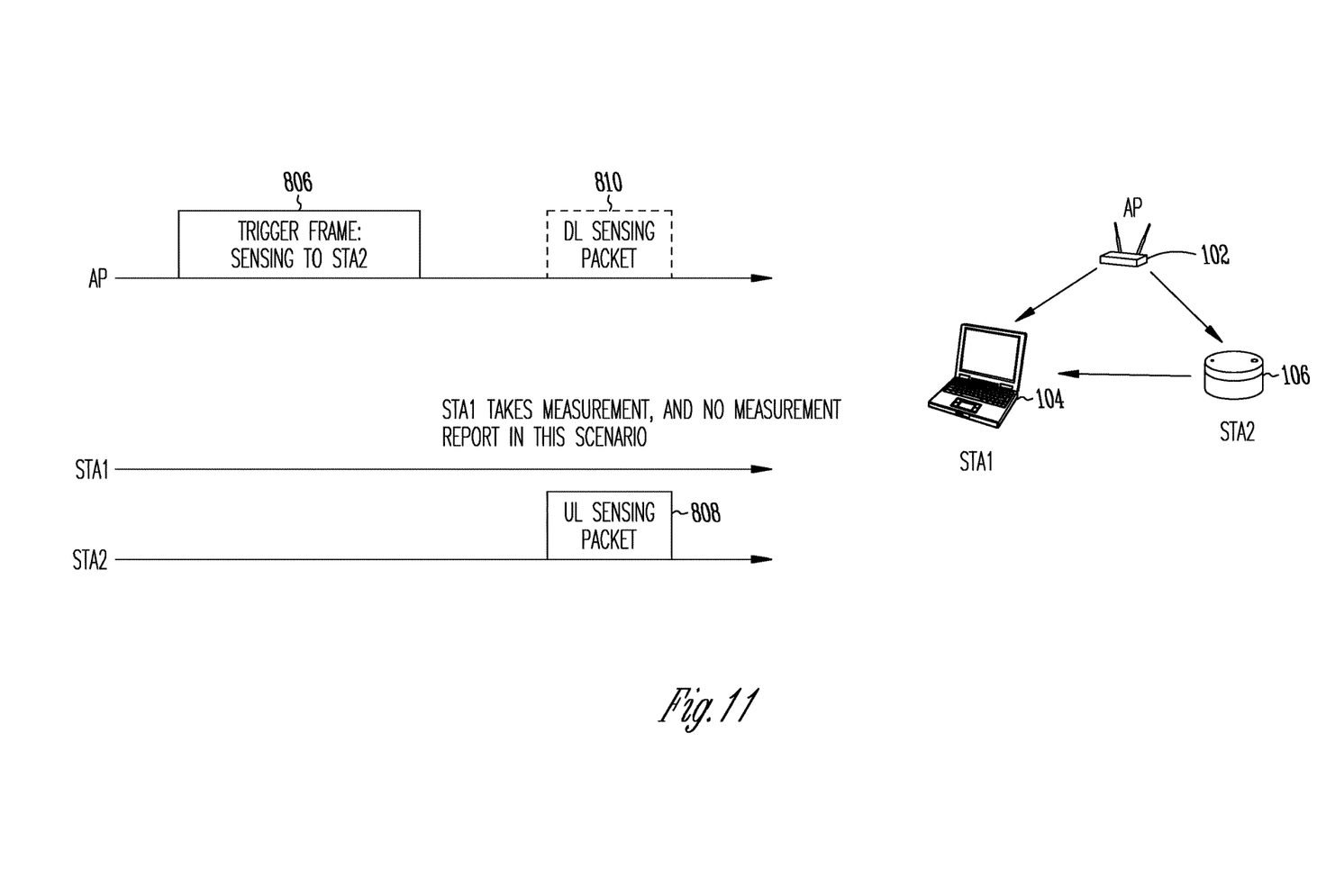
FIG. 11 illustrates the measurement and report phases of WLAN sensing protocol for scenario three in accordance with some embodiments.

In the embodiments illustrated in FIG. 4 and FIG. 11 (scenario 3) if the wireless communication device is a non-AP STA (STA1 104) and is operating as the sensing initiator and the sensing receiver, during the discovery phase 202, the STA1 104 sends a request to the AP STA 102 to initiate a sensing service, the STA1 104 indicates its availability as the sensing receiver, and the AP STA 102 receives identities of the STA2s 106 that are available as the sensing transmitters. During the negotiation phase 206, the STA1 104, operating as the sensing receiver, receives an indication from the AP STA 102 which of the STA2s 106 are designated as the sensing transmitters and a measurement periodicity is determined. In these embodiments, during the measurement phase 208, the STA1 104 receives UL sensing packets transmitted by the STA2s 106 operating as sensing transmitters in response to a trigger frame 806 transmitted by the AP STA 102. During the measurement phase 208, the STA1 104 further receives DL sensing packet 810s transmitted by the AP STA 102 if the AP STA 102 is configured to operate as one of the sensing transmitters. During the measurement phase 208, the STA1 104 may receive the UL sensing packets from the STA2s 106 and the DL sensing packet 810s from the AP STA 102 in accordance with the measurement periodicity. In these embodiments, the UL sensing packets may be transmitted by the STA2s 106 in accordance with an UL OFDMA or UL MU-MIMO technique and the UL sensing packets may be transmitted concurrently with the DL sensing packet 810 transmitted by the AP STA 102, although this is not a requirement.

Figure 5:
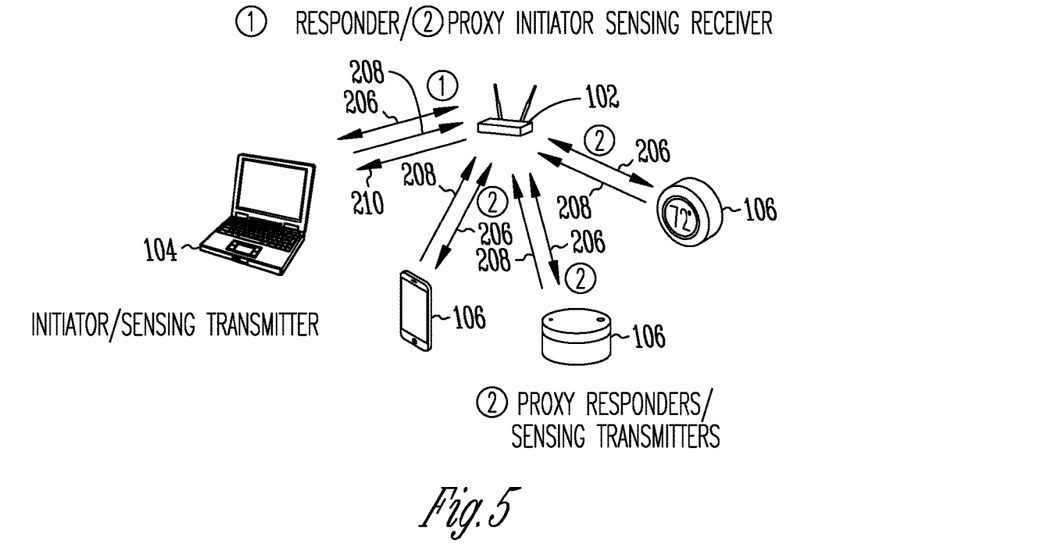
FIG. 5 illustrates scenario four in which a STA1 is operating as a sensing initiator and the STA1 is operating as a sensing transmitter in accordance with some embodiments of the WLAN sensing protocol.
Figure 12:
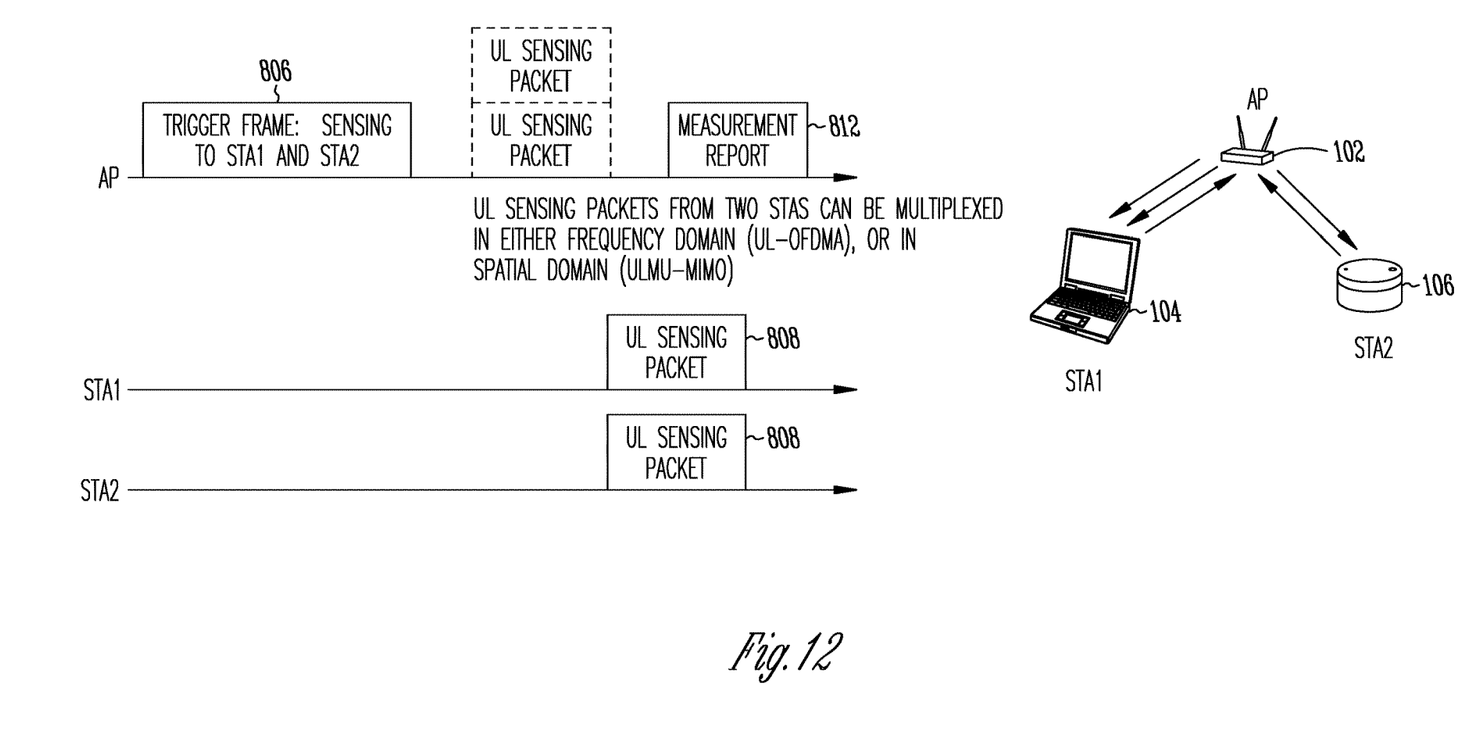
FIG. 12 illustrates the measurement and report phases of WLAN sensing protocol for scenario four in accordance with some embodiments.

In the embodiments illustrated in FIG. 5 and FIG. 12 (scenario 4), if the wireless communication device is a non-AP STA (STA1 104) and is operating as the sensing initiator, during the discovery phase 202, the STA1 104 sends a request to the AP to initiate sensing service. In some embodiments, during the discovery phase 202, the AP may also find STAs that are available to be transmitters (e.g., STA2s). During the measurement phase 208, if the STA1 104 is operating as a sensing transmitter, the STA1 104 is configured to decode a trigger frame 806 from the AP STA 102 to trigger the transmission of UL sensing packets from the STA2s 106 designated as sensing transmitters, and encode an UL sensing packet 808 for transmission to the AP STA 102 in response to the trigger frame 806. In these embodiments, the AP STA 102 is operating as the sensing receive. The UL sensing packet 808 may be multiplexed with UL sensing packet 808s transmitted by other STAs operating as the sensing transmitters. In these embodiments, during the reporting phase 210, the STA1 104, operating as the sensing initiator, is configured to decode a measurement report 812 sent from the AP STA 102. The measurement report 812 may comprise indicators of the sensing measurements based on the UL sensing packet 808s received from the STA2s 106 by the AP STA 102. in these embodiments, if the STA1 104 is to operate as the sensing transmitter, the STA1 104 indicates to the AP STA 102 its availability as a sensing transmitter during the discovery phase 202. In some embodiments, the STA1 104, when operating as the sensing initiator may receive during the negotiation phase 206 the identities of the STA2s 106 that are available as sensing transmitters from the AP STA 102. In some embodiments, the AP STA 102 may use an out-of-band technique to communicate the STA2s 106 that are available as potential sensing transmitters. In some of these embodiments, during the negotiation phase 206, the STA1 104 may indicate to the AP STA 102 which of the STA2s 106 are to be used as sensing transmitters, although this is not a requirement as the AP STA 102 may determine which of the STA2s 106 are to be used as sensing transmitters. In some embodiments during the negotiation phase 206, the STA1 104, operating as a sensing transmitter, may request a measurement periodicity. In these embodiments, the UL sensing packet 808s may be multiplexed in the frequency domain or the spatial domain. In some other embodiments, the UL sensing packets 808 may be multiplexed in time and separately triggered (i.e., triggered one after the other). In some embodiments, the measurement periodicity may further be negotiated between the AP and other transmitters.

Figure 6:
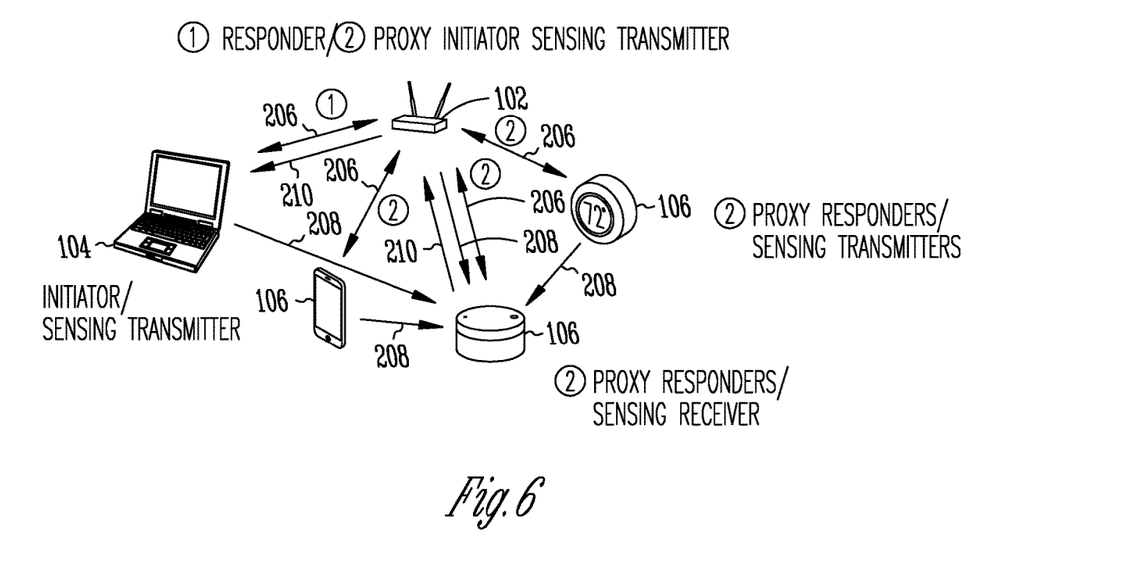
FIG. 6 illustrates scenario five in which a STA1 is operating as a sensing initiator and another STA (STA2) is operating as a sensing receiver in accordance with some embodiments of the WLAN sensing protocol.
Figure 13:
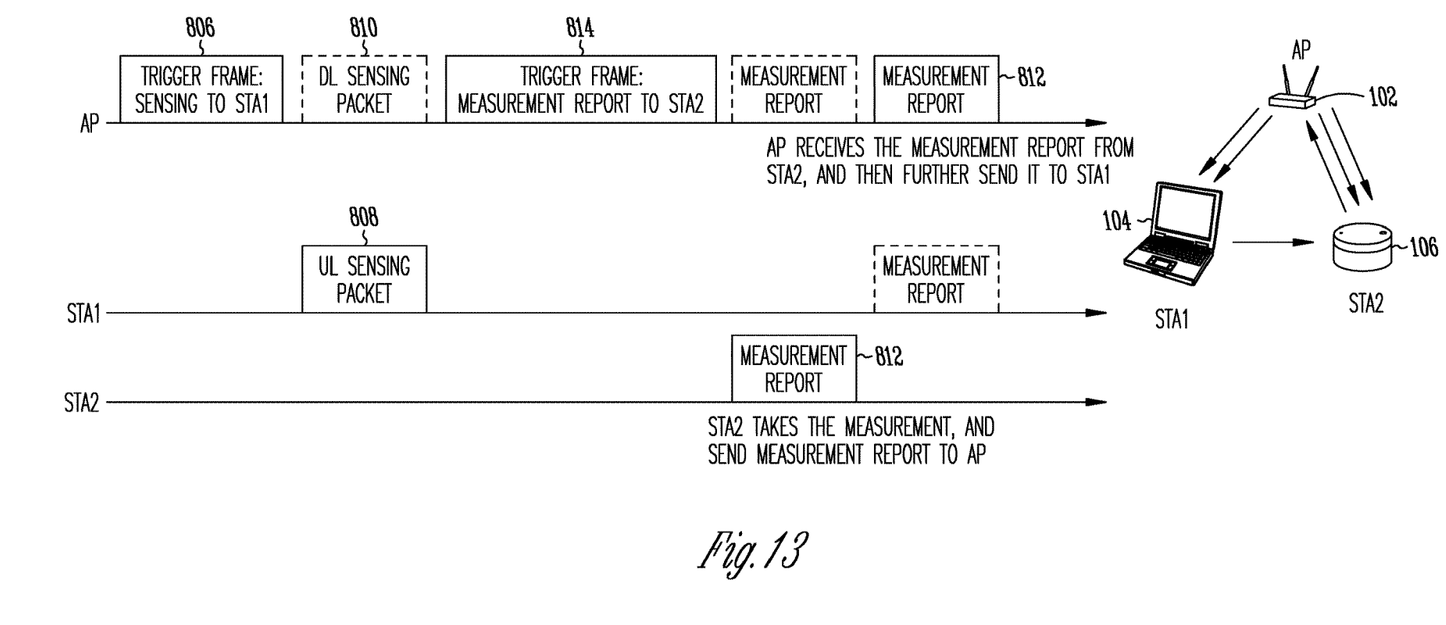
FIG. 13 illustrates the measurement and report phases of WLAN sensing protocol for scenario five in accordance with some embodiments.

In the embodiments illustrated in FIG. 6 and FIG. 13 (scenario 5) if the wireless communication device is a non-AP STA (STA1 104) and is operating as the sensing initiator. In these embodiments, the AP STA 102 is not operating as a sensing receiver. Another non-AP STA (STA2 106) of the BSS may be operating as the sensing receiver. During the discovery phase 202, the STA1 104 sends a request to the AP STA 102 to initiate sensing service. During the measurement phase 208, if the STA1 104 is operating as a sensing transmitter, the STA1 104 is configured to decode a trigger frame 806 from the AP STA 102 to trigger transmission of an UL sensing packet 808 and encode the UL sensing packet 808 for transmission to the AP STA 102 in response to the trigger frame 806. In these embodiments, during the reporting phase 210, the STA1 104 is configured to decode a measurement report 812 received from the AP STA 102. The measurement report 812 may comprise sensor measurements that were measured by the other one or more non-AP STAs (STA2) 106 operating as sensing receivers. In these embodiments, if the STA1 104 is to operate as the sensing transmitter, the STA1 104 indicates to the AP STA 102 its availability as a sensing transmitter during the discovery phase 202. In these embodiments, if the STA1 104 does not operate as a sensing transmitter, the STA1 104 does not indicates to the AP STA 102 its availability as a sensing transmitter during the discovery phase 202, and the STA1 104 does not need to decode the trigger frame 806 from the AP STA 102 and does not encode the UL sensing packet 808. In some embodiments, a trigger frame 814 may be used by the AP STA 102 to trigger transmission of measurement report 812 by the STA2 106 for subsequent transmission to the STA1 104.

In some embodiments, the WLAN sensing protocol may include a calibration phase 204, as illustrated in FIG. 7. During the calibration phase 204, baseline channel estimates may be established for transmitter receiver pairs comprising the sensing receiver and each of the sensing transmitters. The calibration phase 204 is optional and may not be necessary.

In some embodiments, the WLAN sensing protocol may further comprise a teardown phase 212 following the reporting phase 210, as illustrated in FIG. 7. During the teardown phase 212, roles of the STAs of the BSS for performing the WLAN sensing protocol are ended. In some embodiments, the teardown phase 212 may comprise an exchange of messages indicating that the sensing measurements are no longer needed and the STAs may be stripped of their role designation. In some embodiments, the sensing initiator may initiate the teardown stage by sending a message to the AP to notify the sensing transmitters and the sensing receivers.

In some embodiments, a sensing session may have a one-time discovery and negotiation phase, but may have multiple measurement and reporting phases, followed by a single teardown phase. In these embodiments, re-negotiation may be performed during the sensing session if necessary, although the scope of the embodiments is not limited in this respect.

Figure 8:
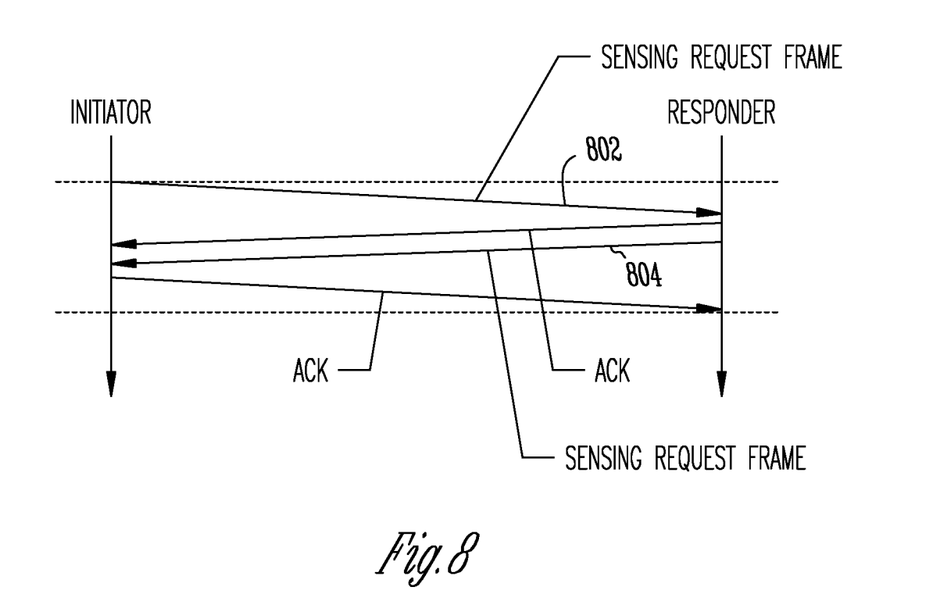
FIG. 8 is a flow diagram of the negotiation phase of the WLAN sensing protocol in accordance with some embodiments.

As illustrated in FIG. 8, in some embodiments the negotiation phase 206 may include the sensing initiator sending a sensing request frame 802 to the sensing responder. After an ACK, the sensing responder may send a sensing response frame 804 back to the sensing initiator. The sensing initiator may acknowledge the sensing response frame 804 with an ACK. In some embodiments, the sensing protocol provides for rules and frame exchanges used to establish a sensing session. The sensing session may comprise a successful establishment of a series of uniquely identifiable measurement event(s) through the use of a Sensing Request/Response frame exchange.

In some of these embodiments, the sensing initiator may be a HE STA or a DMG STA or another 802.11 STA that sets up a sensing session by transmitting a sensing request frame 802. The sensing responder(s) may be a HE STA or a DMG STA that agrees to participate in a sensing session by transmitting a sensing response frame 804 in response to the reception of a sensing request frame 802. Sensing transmitter(s) may be a subset of the group formed by the initiator and responder(s), plus possibly legacy STAs, that transmit at each measurement event(s) of a sensing session. Sensing receiver(s) may be a subset of the group formed by the initiator and responder(s) that receive at each measurement event(s) of a sensing session. In some embodiments, the sensing initiators and responders may be part of a BSS and hence authenticated, however the scope of the embodiments is not limited in this respect as some embodiments apply to multi-AP sensing operations.

In some embodiments, the STA is an HE STA configured to operate in accordance with an IEEE 802.11ax standard within a 2.4 GHz, a 5 GHz or a 6 GHz band, and wherein the trigger frames 806 comprise extended trigger frames 806 or trigger frame 806 variants. In some embodiments, the STA may be an EHT STA configured to operate in accordance with an IEEE 802.11be standard or draft standard. In some embodiments, the STA is a DMG STA configured to operate in accordance with IEEE 802.11ay or IEEE 802.11ad standard within a 60 GHz band, and wherein the trigger frame 806s comprise a CTS-to-self frame appended with a control trailer.

In some embodiments, a physical layer protocol data unit may be a physical layer conformance procedure (PLCP) protocol data unit (PPDU). In some embodiments, the AP and STAs may communicate in accordance with one of the IEEE 802.11 standards. IEEE draft specification IEEE P802.11ax/D4.0, February 2019 is incorporated herein by reference in its entirety. In some embodiments, the AP and STAs may be directional multi-gigabit (DMG) STAs or enhanced DMG (EDMG) STAs configured to communicate in accordance with IEEE 802.11ad standard or IEEE draft specification IEEE P802.11ay, February 2019, which is incorporated herein by reference. In some embodiments, an AP or other STA may decode the HE TB PPDUs received from the client devices, and may estimate channel state information (CSI) for a radio link associated with each of the client devices based on an HE-long-training field (LTF) (HE-LTF) of an associated one of the HE-TB PPDUs received from one of the client devices. In accordance with these embodiments, the AP or other STA may process changes in the CSI of the radio links over time for a WLAN sensing application. It should be noted that a sensing receiver that receives packets for sensing measurements does not need to decode the packets as the STA may use the preamble for determining the sensing measurements. In some embodiments, during the measurement phase 208, the sensing measurements may be performed based on a long-training field (LTF) of received packets.

Figure 14:
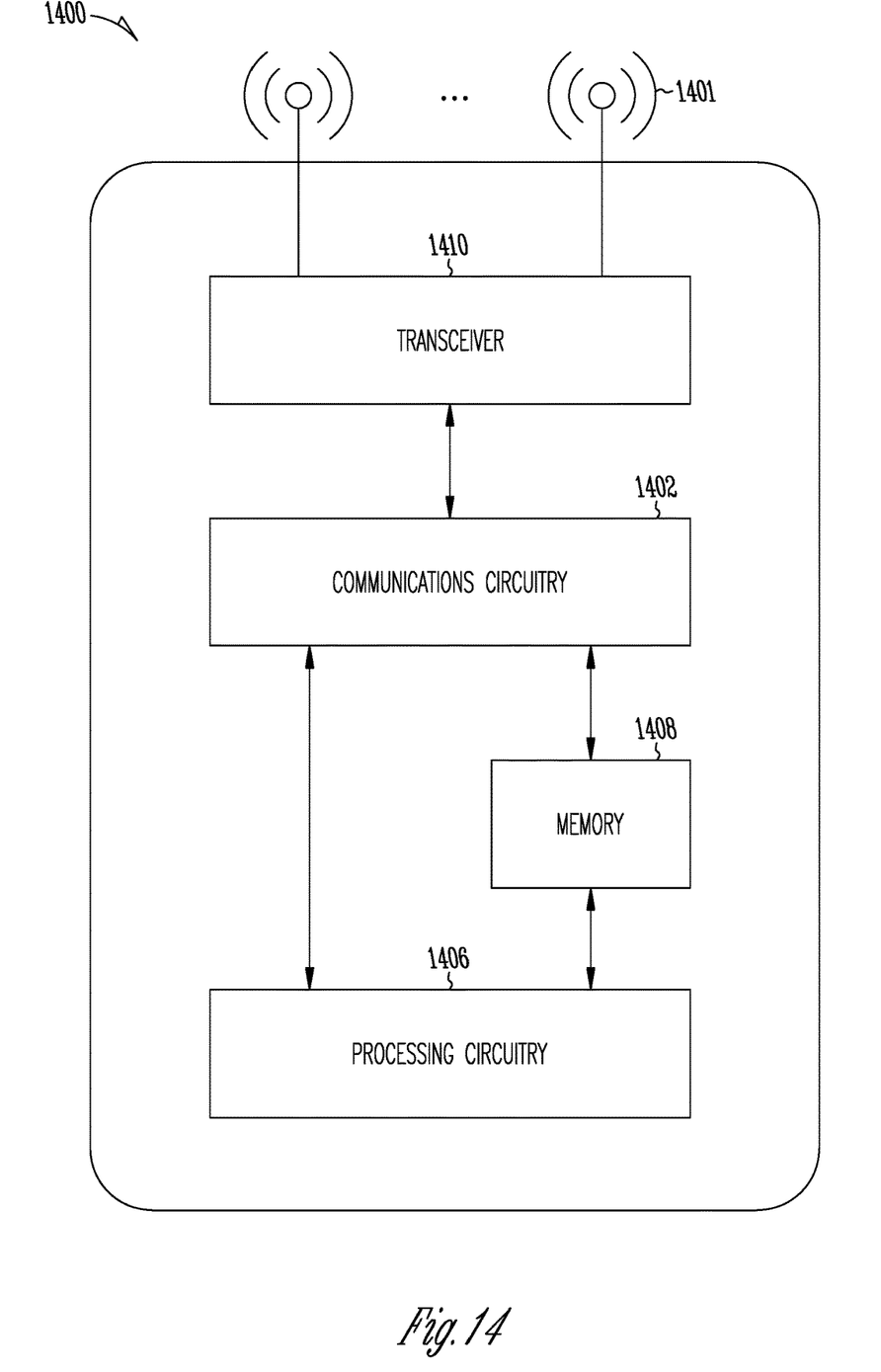
FIG. 14 illustrates a functional diagram of an exemplary communication station, in accordance with one or more example embodiments of the present disclosure.

FIG. 14 shows a functional diagram of an exemplary wireless communication device 1400, in accordance with one or more example embodiments of the present disclosure. In one embodiment, communication device 1400 may be suitable for use as an AP-STA or non-AP STA in accordance with some embodiments described above. The communication station 1400 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) devices. In some embodiments, devices participating in WLAN sensing may comprise a plug-in device dedicated to device sensing, a smart IoT device, or other device.

The communication station 1400 may include communications circuitry 1402 and a transceiver 1410 for transmitting and receiving signals to and from other communication stations using one or more antennas 1401. The communications circuitry 1402 may include circuitry that can operate the physical layer (PHY) communications and/or medium access control (MAC) communications for controlling access to the wireless medium, and/or any other communications layers for transmitting and receiving signals. The communication station 1400 may also include processing circuitry 1406 and memory 1408 arranged to perform the operations described herein. In some embodiments, the communications circuitry 1402 and the processing circuitry 1406 may be configured to perform operations detailed in the above figures, diagrams, and flows.

In accordance with some embodiments, the communications circuitry 1402 may be arranged to contend for a wireless medium and configure frames or packets for communicating over the wireless medium. The communications circuitry 1402 may be arranged to transmit and receive signals. The communications circuitry 1402 may also include circuitry for modulation/demodulation, upconversion/downconversion, filtering, amplification, etc. In some embodiments, the processing circuitry 1406 of the communication station 1400 may include one or more processors. In other embodiments, two or more antennas 1401 may be coupled to the communications circuitry 1402 arranged for sending and receiving signals. The memory 1408 may store information for configuring the processing circuitry 1406 to perform operations for configuring and transmitting message frames and performing the various operations described herein. The memory 1408 may include any type of memory, including non-transitory memory, for storing information in a form readable by a machine (e.g., a computer). For example, the memory 1408 may include a computer-readable storage device, read-only memory (ROM), random-access memory (RAM), magnetic disk storage media, optical storage media, flash-memory devices and other storage devices and media.

In some embodiments, the communication station 1400 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 1400 may include one or more antennas 1401. The antennas 1401 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 1400 may include one or more of a keyboard, a display, a non-volatile memory port, multiple antennas, a graphics processor, an application processor, speakers, and other mobile device elements. The display may be an LCD screen including a touch screen.

Although the communication station 1400 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 1400 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 1400 may include one or more processors and may be configured with instructions stored on a computer-readable storage device.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a wireless communication device configurable for WLAN sensing, the apparatus comprising: processing circuitry; and memory, wherein the processing circuitry is to configure the wireless communication device to perform a WLAN sensing protocol within a basic service set (BSS) comprising one or more stations (STAs) (STA1 and STA2) including an access point station (AP STA), the WLAN sensing protocol performed to estimate features of one or more objects in an area of interest, the WLAN sensing protocol comprising: a discovery phase, a negotiation phase, a measurement phase, and a reporting phase, wherein to perform the WLAN sensing protocol, the processing circuitry configures the wireless communication device to operate as either a sensing initiator or a sensing responder, and to operate as a sensing transmitter and/or a sensing receiver, wherein during the discovery phase, the STAs of the BSS that support WLAN sensing are discovered, at least one of the STAs is identified as a sensing receiver, and one or more of the STAs are identified as potential sensing transmitters, wherein during the negotiation phase, a measurement frequency is determined and one or more of the STAs, identified as the potential sensing transmitters, are designated as sensing transmitters, and wherein during the measurement phase, the one or more STAs that are designated as the sensing transmitters are configured to transmit sensing packets for sensing measurements by one or more STAs that are designated as the sensing receivers; and wherein during the reporting phase, the sensing measurements are provided to the sensing initiator, and wherein when the wireless communication device is an AP STA and is operating as the sensing initiator, the processing circuitry is configured to process the sensing measurements to estimate the features of the one or more objects in the area of interest, the features estimated based on changes in channel state information (CSI) of radio links over time between the AP STA and the one or more STAs.

2. The apparatus of claim 1, wherein the features include one or more of motion detection, gesture recognition and biometric measurement of the one or more objects in the area of interest, the one or more objects comprise non-STA objects, and wherein the features of the one or more objects in the area of interest are determined, at least in part, based on a preamble portions of the sensing packets without decoding non-preamble portions the sensing packets, the preambles including at least a long-training field (LTF).

3. The apparatus of claim 2, wherein if the wireless communication device is an AP STA and is operating as the sensing initiator and if the AP STA is designated as the sensing receiver during the negotiation phase, during the measurement phase, the AP STA is configured to encode a trigger frame for transmission to the STAs (STA1 and STA2) that have been designated as sensing transmitters during the negotiation phase, the trigger frame to trigger the STAs to transmit uplink sensing frames to the AP STA in accordance with either an UL OFDMA or UL MU-MIMO technique, and wherein the AP STA is configured to determine the sensing measurements from the UL sensing frames.

4. The apparatus of claim 2, wherein if the wireless communication device is an AP STA and is operating as the sensing initiator, and if the AP STA is designated as a sensing transmitter during the negotiation phase, during the measurement phase the processing circuitry of the AP STA is configured to:

transmit a downlink (DL) sensing frame to the STAs (STA1 and STA2) that have been designated as the sensing receivers during the negotiation phase, the downlink sensing frame to be either broadcast by the AP STA or transmitted in accordance with either a DL OFDMA or DL MU-MIMO technique to each of the STAs designated as sensing receivers; and encode a trigger frame for transmission following the DL sensing frame, the trigger frame to trigger transmission of measurement report frames by each of the STAs designated as sensing receivers, wherein during the reporting phase, the AP STA is configured to receive measurement reports from the STAs designated as sensing receivers, the measurement report frames comprising indicators of the sensing measurements that were measured by the STAs.

5. The apparatus of claim 2, wherein if the wireless communication device is a non-AP STA (STA1) and is operating as the sensing initiator and the sensing receiver:

during the discovery phase, the STA1 sends a request to the AP STA to initiate a sensing service, the STA1 indicates its availability as the sensing receiver, and the STA1 receives identities of the STA2s that are available as the sensing transmitters;

during the negotiation phase, the STA1, operating as the sensing receiver, receives an indication from the AP STA which of the STA2s are designated as the sensing transmitters and a measurement periodicity is determined;

during the measurement phase, the STA1 receives UL sensing frames transmitted by the STA2s operating as sensing transmitters in response to a trigger frame transmitted by the AP STA, and during the measurement phase, the STA1 further receives DL sensing frames transmitted by the AP STA if the AP STA is configured to operate as one of the sensing transmitters, wherein during the measurement phase, the STA1 received the UL sensing frames from the STA2s and the DL sensing frames from the AP STA in accordance with the measurement periodicity.

6. The apparatus of claim 2, wherein if the wireless communication device is a non-AP STA (STA1) and is operating as the sensing initiator:

during the discovery phase, the STA1 sends a request to the AP to initiate sensing service;

during the measurement phase, if the STA1 is operating as a sensing transmitter, the STA1 is configured to: decode a trigger frame from the AP STA to trigger the transmission of UL sensing frames from the STA2s designated as sensing transmitters; and encode an UL sensing packet for transmission to the AP-STA in response to the trigger frame, the AP STA operating as the sensing receiver, the UL sensing packet being multiplexed with UL sensing packets transmitted by other STAs operating as the sensing transmitters; and during the reporting phase, the STA1, operating as the sensing initiator, is configured to decode a measurement report sent from the AP STA, the measurement report comprising indicators of the sensing measurements based on the UL sensing packets received from the STA2s by the AP STA, wherein if the STA1 is to operate as the sensing transmitter, the STA1 indicates to the AP STA its availability as a sensing transmitter during the discovery phase.

7. The apparatus of claim 2, wherein if the wireless communication device is a non-AP STA (AP1) and is operating as the sensing initiator, during the discovery phase, the STA1 sends a request to the AP STA to initiate sensing service;

during the measurement phase, if the STA1 is operating as a sensing transmitter, the STA1 is configured to: decode a trigger frame from the AP STA to trigger transmission of an UL sensing frame; and encode an UL sensing packet for transmission to the AP STA in response to the trigger frame; and during the reporting phase, the STA1 is configured to decode a measurement report received from the AP STA, the measurement report comprising sensor measurements that were measured by the other one or more non-AP STAs (STA2) operating as sensing receivers, wherein if the STA1 is to operate as the sensing transmitter, the STA1 indicates to the AP STA its availability as a sensing transmitter during the discovery phase.

8. The apparatus of claim 2, wherein the WLAN sensing protocol further comprises a teardown phase following the reporting phase, where during the teardown phase roles of the STAs of the BSS for performing the WLAN sensing protocol are ended.

9. The apparatus of claim 2, wherein the STA is an HE STA configured to operate in accordance with an IEEE 802.11ax standard within a 2.4 GHz, a 5 GHz or a 6 GHz band, and wherein the trigger frames comprise extended trigger frames or trigger frame variants.

10. The apparatus of claim 2, wherein the STA is a DMG STA configured to operate in accordance an IEEE 802.11ay standard within a 60 GHz band, and wherein the trigger frames comprise an CTS-to-self frame appended with a control trailer.

11. The apparatus of claim 2, wherein during the measurement phase, the sensing measurements are performed based on a long-training field (LTF) of received packets.

12. A non-transitory computer-readable storage medium that stores instructions for execution by processing circuitry of a wireless communication device configurable for WLAN sensing, wherein the processing circuitry is to configure the wireless communication device to perform a WLAN sensing protocol within a basic service set (BSS) comprising one or more stations (STAs) (STA1 and STA2) including an access point station (AP STA), the WLAN sensing protocol performed to estimate features of one or more objects in an area of interest, the WLAN sensing protocol comprising: a discovery phase, a negotiation phase, a measurement phase, and a reporting phase,
wherein to perform the WLAN sensing protocol, the processing circuitry configures the wireless communication device to operate as either a sensing initiator or a sensing responder, and to operate as a sensing transmitter and/or a sensing receiver,
wherein during the discovery phase, the STAs of the BSS that support WLAN sensing are discovered, at least one of the STAs is identified as a sensing receiver, and one or more of the STAs are identified as potential sensing transmitters,
wherein during the negotiation phase, a measurement frequency is determined and one or more of the STAs, identified as the potential sensing transmitters, are designated as sensing transmitters, and
wherein during the measurement phase, the one or more STAs that are designated as the sensing transmitters are configured to transmit sensing packets for sensing measurements by one or more STAs that are designated as the sensing receivers; and
wherein during the reporting phase, the sensing measurements are provided to the sensing initiator, and
wherein when the wireless communication device is an AP STA and is operating as the sensing initiator, the processing circuitry is configured to process the sensing measurements to estimate the features of the one or more objects in the area of interest, the features estimated based on changes in channel state information (CSI) of radio links over time between the AP STA and the one or more STAs.

13. The non-transitory computer readable storage medium of claim 12, wherein the features include one or more of motion detection, gesture recognition and biometric measurement of the one or more objects in the area of interest, the one or more objects comprise non-STA objects, and
wherein the features of the one or more objects in the area of interest are determined, at least in part, based on a preamble portions of the sensing packets without decoding non-preamble portions the sensing packets, the preambles including at least a long-training field (LTF).

14. The non transitory computer readable medium of claim 13, wherein if the wireless communication device is an AP STA and is operating as the sensing initiator and if the AP STA is designated as the sensing receiver during the negotiation phase, during the measurement phase, the AP STA is configured to encode a trigger frame for transmission to the STAs (STA1 and STA2) that have been designated as sensing transmitters during the negotiation phase, the trigger frame to trigger the STAs to transmit uplink sensing frames to the AP STA in accordance with either an UL OFDMA or UL MU-MIMO technique, and
wherein the AP STA is configured to determine the sensing measurements from the UL sensing frames.

15. The non transitory computer readable storage medium of claim 13, wherein if the wireless communication device is an AP STA and is operating as the sensing initiator, and if the AP STA is designated as a sensing transmitter during the negotiation phase, during the measurement phase the processing circuitry of the AP STA is configured to:
transmit a downlink (DL) sensing frame to the STAs (STA1 and STA2) that have been designated as the sensing receivers during the negotiation phase, the downlink sensing frame to be either broadcast by the AP STA or transmitted in accordance with either a DL OFDMA or DL MU-MIMO technique to each of the STAs designated as sensing receivers; and
encode a trigger frame for transmission following the DL sensing frame, the trigger frame to trigger transmission of measurement report frames by each of the STAs designated as sensing receivers,
wherein during the reporting phase, the AP STA is configured to receive measurement reports from the STAs designated as sensing receivers, the measurement report frames comprising indicators of the sensing measurements that were measured by the STAs.

16. The non transitory computer readable storage medium of claim 13, wherein if the wireless communication device is a non-AP STA (STA1) and is operating as the sensing initiator and the sensing receiver:
during the discovery phase, the STA1 sends a request to the AP STA to initiate a sensing service, the STA1 indicates its availability as the sensing receiver, and the STA1 receives identities of the STA2s that are available as the sensing transmitters;
during the negotiation phase, the STA1, operating as the sensing receiver, receives an indication from the AP STA which of the STA2s are designated as the sensing transmitters and a measurement periodicity is determined;
during the measurement phase, the STA1 receives UL sensing frames transmitted by the STA2s operating as sensing transmitters in response to a trigger frame transmitted by the AP STA, and
during the measurement phase, the STA1 further receives DL sensing frames transmitted by the AP STA if the AP STA is configured to operate as one of the sensing transmitters,
wherein during the measurement phase, the STA1 received the UL sensing frames from the STA2s and the DL sensing frames from the AP STA in accordance with the measurement periodicity.

17. The non transitory computer readable storage medium of claim 13, wherein if the wireless communication device is a non-AP STA (STA1) and is operating as the sensing initiator:
during the discovery phase, the STA1 sends a request to the AP to initiate sensing service;
during the measurement phase, if the STA1 is operating as a sensing transmitter, the STA1 is configured to: decode a trigger frame from the AP STA to trigger the transmission of UL sensing frames from the STA2s designated as sensing transmitters; and encode an UL sensing packet for transmission to the AP-STA in response to the trigger frame, the AP STA operating as the sensing receiver, the UL sensing packet being multiplexed with UL sensing packets transmitted by other STAs operating as the sensing transmitters; and during the reporting phase, the STA1, operating as the sensing initiator, is configured to decode a measurement report sent from the AP STA, the measurement report comprising indicators of the sensing measurements based on the UL sensing packets received from the STA2s by the AP STA, wherein if the STA1 is to operate as the sensing transmitter, the STA1 indicates to the AP STA its availability as a sensing transmitter during the discovery phase.

18. The non transitory computer readable storage medium of claim 13, wherein if the wireless communication device is a non-AP STA (AP1) and is operating as the sensing initiator, during the discovery phase, the STA1 sends a request to the AP STA to initiate sensing service;

during the measurement phase, if the STA1 is operating as a sensing transmitter, the STA1 is configured to: decode a trigger frame from the AP STA to trigger transmission of an UL sensing frame; and encode an UL sensing packet for transmission to the AP STA in response to the trigger frame; and during the reporting phase, the STA1 is configured to decode a measurement report received from the AP STA, the measurement report comprising sensor measurements that were measured by the other one or more non-AP STAs (STA2) operating as sensing receivers, wherein if the STA1 is to operate as the sensing transmitter, the STA1 indicates to the AP STA its availability as a sensing transmitter during the discovery phase.

19. An apparatus of an access point station (AP STA), the apparatus comprising: processing circuitry; and memory, wherein the processing circuitry is to configure the AP STA to perform a WLAN sensing protocol within a basic service set (BSS) comprising one or more stations (STAs) (STA1 and STA2) including the AP STA, the WLAN sensing protocol performed to estimate features of one or more objects in an area of interest, the WLAN sensing protocol comprising: a discovery phase, a negotiation phase, a measurement phase, and a reporting phase, wherein to perform the WLAN sensing protocol, the processing circuitry configures the AP STA to operate as either a sensing initiator or a sensing responder, and to operate as a sensing transmitter and/or a sensing receiver, wherein if the AP STA is operating as the sensing initiator and if the AP STA is designated as the sensing receiver during the negotiation phase, during the measurement phase, the AP STA is configured to encode a trigger frame for transmission to the STAs (STA1 and STA2) that have been designated as sensing transmitters during the negotiation phase, the trigger frame to trigger the STAs to transmit uplink sensing frames to the AP STA in accordance with either an UL OFDMA or UL MU-MIMO technique, and the AP STA is configured to determine the sensing measurements from the UL sensing frames, and wherein when the AP STA and is operating as the sensing initiator, the processing circuitry is configured to process the sensing measurements to estimate the features of the one or more objects in the area of interest, the features estimated based on changes in channel state information (CSI) of radio links over time between the AP STA and the one or more STAs.

20. The apparatus of claim 19, wherein the features include one or more of motion detection, gesture recognition and biometric measurement of the one or more objects in the area of interest, the one or more objects comprise non-STA objects, and wherein the features of the one or more objects in the area of interest are determined, at least in part, based on a preamble portions of the sensing packets without decoding non-preamble portions the sensing packets, the preambles including at least a long-training field (LTF).

21. The apparatus of claim 20, wherein if the AP STA is operating as the sensing initiator, and if the AP STA is designated as a sensing transmitter during the negotiation phase, during the measurement phase the processing circuitry of the AP STA is configured to:

transmit a downlink (DL) sensing frame to the STAs (STA1 and STA2) that have been designated as the sensing receivers during the negotiation phase, the downlink sensing frame to be either broadcast by the AP STA or transmitted in accordance with either a DL OFDMA or DL MU-MIMO technique to each of the STAs designated as sensing receivers; and encode a trigger frame for transmission following the DL sensing frame, the trigger frame to trigger transmission of measurement report frames by each of the STAs designated as sensing receivers, wherein during the reporting phase, the AP STA is configured to receive measurement reports from the STAs designated as sensing receivers, the measurement report frames comprising indicators of the sensing measurements that were measured by the STAs.

\* \* \* \* \*